United States Patent
Sabi et al.

(10) Patent No.: US 7,092,343 B2
(45) Date of Patent: Aug. 15, 2006

(54) OPTICAL RECORDING AND REPRODUCING METHOD AND APPARATUS HAVING MULTIPLE RECORDING LAYERS

(75) Inventors: Yuichi Sabi, Tokyo (JP); Takashi Iwamura, Kanagawa (JP); Mitsuaki Oyamada, Kanagawa (JP); Sakuya Tamada, Tokyo (JP)

(73) Assignee: Sony Corporation, Tokyo (JP)

( * ) Notice: Subject to any disclaimer, the term of this patent is extended or adjusted under 35 U.S.C. 154(b) by 388 days.

(21) Appl. No.: 10/472,269

(22) PCT Filed: Jan. 22, 2003

(86) PCT No.: PCT/JP03/00531

§ 371 (c)(1),
(2), (4) Date: Sep. 18, 2003

(87) PCT Pub. No.: WO03/067579

PCT Pub. Date: Aug. 14, 2003

(65) Prior Publication Data

US 2004/0095867 A1 May 20, 2004

(30) Foreign Application Priority Data

Jan. 22, 2002 (JP) ............................. 2002-013241

(51) Int. Cl.
*G11B 3/74* (2006.01)
*G11B 7/24* (2006.01)

(52) U.S. Cl. ...................... 369/94; 369/275.2; 369/283

(58) Field of Classification Search ................... None
See application file for complete search history.

(56) References Cited

U.S. PATENT DOCUMENTS

| 6,141,299 A * | 10/2000 | Utsumi .................... 369/53.37 |
| 2001/0016242 A1 | 8/2001 | Miuamoto |
| 2002/0001691 A1 | 1/2002 | Sabi et al. |

FOREIGN PATENT DOCUMENTS

| CN | 1336655 A | 2/2002 |
| EP | 1143431 A2 | 10/2001 |
| JP | 2001-101709 A | 4/2001 |
| JP | 2001-209974 A | 8/2001 |
| JP | 2001-266402 A | 9/2001 |
| JP | 2001-273672 A | 10/2001 |

OTHER PUBLICATIONS

Suzuki Katsumi, Single-Sided Two Layered Optical Disk, Sep. 28, 2001, Machine Translatrion Patent Abstracts of Japan.*

* cited by examiner

*Primary Examiner*—Thang V. Tran
*Assistant Examiner*—Joseph Haley
(74) *Attorney, Agent, or Firm*—Robert J. Depke; Trexler, Bushnell, Giangiorgi, Blackstone & Marr, Ltd.

(57) ABSTRACT

An optical recording medium having two or more information recording layers in which information is recorded at a high recording density. The optical recording medium is comprised of information recording layers between a first surface at which light is incident and a second surface opposite the first surface. The first information recording layer nearest to the second surface is a phase-modulation information recording layer, and the second information recording layer is a reflectance-modulation information recording layer.

7 Claims, 3 Drawing Sheets

10

20

OPTICAL RECORDING AND REPRODUCING METHOD AND APPARATUS HAVING MULTIPLE RECORDING LAYERS

This application claims priority to Japanese Patent Application Number JP2002-13241, filed Jan. 22, 2002, which is incorporated herein by reference.

TECHNICAL FIELD

The present invention relates to an optical recording and reproducing method as well as an optical recording medium for performing at least recording or reproduction of information.

BACKGROUND ART

A high recording density in an optical recording medium, for example, an optical disc is usually realized by a method of making wavelengths of irradiating light shorter and making numerical aperture of an objective lens larger. However, by further combining this method with forming a multilayer of information-retaining layers, that is, information-recording layers, it will be possible to realize a remarkable high-density recording.

In the optical recording medium, however, if a multilayer of information-recording layers is formed, or a plurality of information-recording layers are laminated, a problem is posed that, as the information-recording layer becomes distant from a principal plane (incident plane) on the side where light enters the optical recording medium, a less amount of light will reach the layer, because each information-recording layer absorbs light.

This is an unavoidable problem when a single light source is employed for the plurality of information-recording layers.

Moreover, the same applies to return light from the information-recording layer, namely, detected light in reproduction. The return light from the information-recording layer at a distant position from the incident plane is made to return by permeating other information-recording layers positioned on the incident-plane side of optical recording medium while the light is detected, so that the amount of that light decreases.

Therefore, the more distant the information-recording layer becomes from the incident plane, the higher reflectance needs to be set. At the same time, the modulation factor needs to be high to the same extent.

Incidentally, a detection principle of the optical recording medium such as an optical disc can generally be divided into two ways.

One of them is a phase-modulation system typically employed in CD-ROM (Compact Disc-Read Only Memory) disc, what is called CD-R or DVD-R, that is, write-once CD or DVD (Digital Versatile Disc), and the like.

In this phase-modulation system, while reflectance within an information-recorded mark is made equal to reflectance in its circumference for making the reflectance uniform, an optical-path length in the information-recorded mark is made different from an optical-path length in its circumference for making the phase of reflected light change to cause an interference in a light spot, with the result that the amount of return light is made to change.

The other of them is a reflectance-modulation system typically employed in optical discs using a phase-change material such as what is called CD-RW, DVD-RW, or similar which is a rewritable type CD or DVD. In this reflectance-modulation system, by utilizing that reflectance within the information-recorded mark is lower than reflectance in the circumference, a change in the amount of return light due to the difference of reflectance is detected directly.

Incidentally, the above-described information-recording layer in the phase-modulation system typified by that of CD-R or DVD-R is conventionally formed of a recording film composed of an organic dye. An optical recording medium whose recording film is thus composed of the organic dye material has such advantages as it is easy to manufacture, simple to handle the material, and low in cost.

In the phase-modulation system, it is required that the reflectance should be unchanged before and after recording to be maintained almost uniformly, in order to cause an effective interference with the information-recorded mark and its circumference.

To this end, practically the CD-R or the like is arranged such that the reflectance may be unchanged before and after recording by making the information-recording layer formed of the recording film of organic dye into a multilayer structure in which a thick film of metal such as Au or Ag is laminated.

However, when the information-recording layer is made into a multilayer structure in which the thick metal film is laminated, the problem arises that incident light may not reach the information-recording layer located at a distant position from the incident plane.

Accordingly, it is impossible to apply, without any change, such a conventional design for the recording film composed of organic dye to the information-recording layer having the multilayer structure.

DISCLOSURE OF THE INVENTION

The present invention relates to an optical recording and reproducing method for performing at least recording or reproduction of information on an optical recording medium, and also to the optical recording medium, wherein the optical recording medium is made into such a multilayer structure that two or more information-recording layers are laminated, and the incidence of light and the detection of return light may be performed with high efficiency with respect to the information-recording layer at a distant position from an incident side of the optical recording medium.

The present invention provides an optical recording medium as well as an optical recording and reproducing method capable of allowing a plurality of information-recording layers of the optical recording medium to be formed of recording films made of organic dye, to make the manufacturing simpler, to make the price lower and also make it possible to obtain satisfactory recording and reproduction characteristics relating to each information-recording layer.

An optical recording and reproducing method according to the present invention is the method for performing at least recording or reproduction of information using an optical recording medium which has a plurality of information-recording layers between one principal plane on the side that light enters the optical recording medium and the other principal plane on the side opposite thereto. Of the plurality of information-recording layers, a first information-recording layer nearest to the other principal plane is made to be a phase-modulation type information-recording layer and other information-recording layer(s) is made to be a reflectance-modulation type information-recording layer(s). By light incident from the side of the one principal plane, the phase-modulation type recording or reproduction of information is performed with respect to the first information-recording layer, and the reflectance-modulation type recording or reproduction of information is performed with respect to other information-recording layer.

An optical recording medium according to the present invention is the medium which has a plurality of information-recording layers between one principal plane capable of making light incident and the other principal plane on the side opposite to the one principal plane. Of the plurality of information-recording layers, a first information-recording layer nearest to the other principal plane is made to be a phase-modulation type information-recording layer and other information-recording layer(s) is made to be a reflectance-modulation type information-recording layer(s).

Moreover, in the optical recording medium used for the above-described optical recording and reproducing method according to the present invention, as well as the above-described optical recording medium according to the present invention, it is possible to make at least one or more information-recording layers of the plurality of information-recording layers into the structure containing an organic material which causes a change in its physical property by absorbing light to change optical constants. For this organic material, an organic dye can be employed.

According to the optical recording and reproducing method of the present invention, by using the optical recording medium which has a plurality of information-recording layers between one principal plane on the incident side and the other principal plane on the opposite side thereto, and in which the first information-recording layer nearest to the other principal plane is made to be the phase-modulation type information-recording layer, and other information-recording layer(s) is made to be the reflectance-modulation type information-recording layer(s), and by performing the phase-modulation type recording or reproduction of information with respect to the first information-recording layer, and performing the reflectance-modulation type recording or reproduction of information with respect to other information-recording layer, upon incidence of light from the one principal plane, it is possible to make light incident from the one principal plane of the optical recording medium and perform recording or reproduction of information with respect to the plurality of information-recording layers of the optical recording medium.

According to the above-described structure of optical recording medium of the present invention, because the first information-recording layer nearest to the other principal plane is made to be the phase-modulation type information-recording layer, a signal can be detected from the first information-recording layer by the phase-modulation method. Also, because the other information-recording layer is made to be the reflectance-modulation type information-recording layer, a signal can be detected therefrom by the reflectance-modulation method.

Further, in the optical recording medium used for the optical recording and reproducing method according to the present invention, when the first information-recording layer and also the other information-recording layer are each formed of an organic dye film, the refractive index will change before and after the recording. This provides the principle of the recording. Specifically, for example, a refractive index of an organic dye film before recording is set to be greatly different from that of an adjacent layer, for example, a substrate, so that reflection may occur at a boundary surface between the organic dye film and its adjacent layer of other material. At the same time, a refractive index of the organic dye film after recording is set to be near to that of the other material layer forming the above boundary surface so as to reduce reflectance between the organic dye film and the substrate. By doing so, it is possible to obtain what is called the reflectance-modulation type information-recording layer from which a recorded information signal is detected by detecting the reflectance. On the other hand, it is also possible to make the phase-modulation type information-recording layer by causing a change in the optical-path length by recording on the basis of the change in refractive index.

BEST MODE FOR CARRYING OUT THE INVENTION

Figure 1:
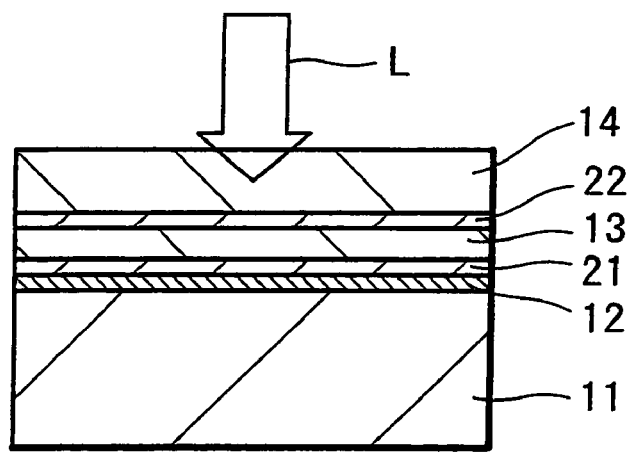
FIG. 1 is a schematic structural diagram (sectional diagram) of an optical disc as an embodiment according to the present invention.

The present invention provides a method for performing at least recording or reproduction of information with respect to an optical recording medium, using an optical recording medium which has a plurality of information-recording layers between one principal plane on the side that light enters the optical recording medium and the other principal plane on the side opposite thereto. Of the plurality of information-recording layers, a first information-recording layer nearest to the other principal plane is made to be a phase-modulation type information-recording layer, and the other information-recording layer(s) is made to be a reflectance-modulation type information-recording layer(s). By light incident from the side of the one principal plane, with respect to the first information-recording layer recording or reproduction of information is performed using the phase-modulation method, and with respect to the other information-recording layer(s) recording or reproduction of information is performed using the reflectance-modulation method.

Moreover, in the above-described optical recording and reproducing method, the present invention makes a change rate $(R_0-R)/R_0$ smaller than a modulation factor of a reproduction signal detected from information-recorded marks in the first information-recording layer of optical recording medium, where $R_0$ is reflectance before recording at a position corresponding to the inside of information-recorded mark and R is reflectance after recording at the same position; and in the other information-recording layer, the present invention makes the similar change rate $(R_0-R)/R_0$ concerning the information-recorded mark equal to or more than a modulation factor of the reproduction signal detected from the information-recorded marks.

The present invention provides an optical recording medium which has a plurality of information-recording layers between one principal plane capable of making light incident and the other principal plane on the side opposite to this one principal plane. Of the plurality of information-recording layers, a first information-recording layer nearest to the other principal plane is made to be a phase-modulation type information-recording layer, and the other information-recording layer(s) is made to be a reflectance-modulation type information-recording layer(s).

Further, in the above-described optical recording medium, the present invention makes a width of recording area of the reflectance-modulation type information-recording layer wider than that of the phase-modulation type information-recording layer.

Moreover, in the above-described optical recording medium, the present invention makes a change rate $(R_0-R)/R_0$ smaller than a modulation factor of a reproduction signal detected from the information-recorded marks in the first information-recording layer, where $R_0$ is reflectance before recording at a position corresponding to the inside of information-recorded mark and R is reflectance after recording at the same position; and in the other information-recording layer, the present invention makes the similar change rate $(R_0-R)/R_0$ concerning the information-recorded mark equal to or more than the modulation factor of a reproduction signal detected from the information-recorded marks.

Furthermore, according to the present invention, in the above-described optical recording medium at least one or more information-recording layers of the plurality of information-recording layers are formed of a recording film in which a change in optical constants is caused by absorbing light.

Also, according to the present invention, in the above-described optical recording medium, the recording film contains an organic material which causes a change in the physical property and thus the change in optical constants by absorbing light.

Moreover, in the above-described optical recording medium, the present invention employs an organic dye for that organic material.

Further, according to the present invention, in the above-described optical recording medium, a reflective layer is provided on the side of the other principal plane of the first information-recording layer.

FIG. 1 shows a schematic structural diagram (sectional diagram) of an optical disc as an embodiment of the present invention.

The optical disc 10 has the structure in which a reflective layer 12, a first information-recording layer 21, an intermediate layer 13, a second information-recording layer 22, and a surface-protective layer (a light-transmissive layer) 14 are laminated on a substrate 11.

In other words, the information-recording layer consists of two layers of the first information-recording layer 21 and the second information-recording layer 22.

The optical disc 10 in this embodiment has the structure in which light L is incident not from the side of the substrate 11 but from the side opposite to the substrate 11, that is, the side of the surface-protective layer 14.

On the substrate 11 and on the intermediate layer 13, though not shown in the figure, guide grooves are provided so that the tracking of the first information-recording layer 21 and the second information-recording layer 22 can be performed, respectively.

A film in which the change in optical constants is caused by absorbing light can be employed for the first information-recording layer 21 or the second information-recording layer 22.

Additionally, only one of the first information-recording layer 21 and the second information-recording layer 22 may be the film in which the change in optical constants is caused by absorbing light.

The change in optical constants due to light absorption causes a change in refractive index of the information-recording layer.

The first information-recording layer 21 and second information-recording layer 22 can be formed of an organic material film, for example, an organic dye film.

The organic dye film is composed of such material that the physical property will change (for example, thermal decomposition is caused to change the molecular structure, molecules are unchanged and the molecular arrangement changes, or composite change thereof is caused) by absorbing light.

Such an organic dye film can be composed using well-known materials such as triphenylamine tetramer.

When the recording film forming the information-recording layer is made of the organic dye film, advantages of making the manufacturing simplified and making the price lower can be obtained.

The reflective layer 12 is formed of a film having large reflectance with respect to the incident light L.

For the reflective layer 12, a metal film such as an Ag-alloy sputtered film or the like can be employed.

For the intermediate layer 13 and the surface-protective layer 14, a material having large transmissivity with respect to the incident light L is employed. For example, UV-curing resin can be used.

The thickness of the intermediate layer 13 is preferably set to 5 μm to 50 μm.

Furthermore, the first information-recording layer 21 is made to be a phase-modulation type information-recording layer in which information can be recorded or reproduced by the phase-modulation method.

To this end, the change rate $(R_0-R)/R_0$ is made smaller than the modulation factor of a reproduction signal detected from the information-recorded mark, where $R_0$ is reflectance before recording at a position corresponding to the inside of the information-recorded mark and R is reflectance after recording at the same position.

This makes a change in reflectance before and after recording extremely small, so that it will be possible to detect a signal modulated by the phase-modulation method and also make the first information-recording layer 21 to be the phase-modulation type information-recording layer.

As described above, in order to make the change in reflectance before and after recording extremely small, the reflective layer 12 is provided on the side opposite to the light-incident plane of the first information-recording layer 21. Moreover, in order to obtain a sufficiently modulated signal and also increase S/N ratio, the width of recording area is regulated corresponding to a wavelength λ of a light source in a readout optical system and a numerical aperture NA of a condenser lens.

In this way, by providing the reflective layer 12 using a material of comparatively high reflectance on the side opposite to the light-incident plane of the first information-recording layer 21, reflectance before recording and reflectance after recording in the first information-recording layer 21 are both near to reflectance of the reflective layer 12.

Because optical constants including refractive indexes are different between the information-recorded mark and the information-recording layer 21 before recording, an optical-path length when light goes to the reflective layer 12 will be different from an optical-path length when the light comes back therefrom.

This makes it possible to detect a signal modulated by the phase-modulation method.

On the other hand, the second information-recording layer 22 is made to be the reflectance-modulation type information-recording layer in which information can be recorded or reproduced by the reflectance-modulation method.

To this end, the change rate $(R_0-R)/R_0$ is made equal to or more than the modulation factor of a reproduction signal detected from the information-recorded mark, where $R_0$ is reflectance before recording at a position corresponding to the inside of information-recorded mark and R is reflectance after recording at the same position.

By doing so, the change in reflectance before and after recording is enlarged, so that it is possible to detect a signal modulated by the reflectance-modulation method and thus the second information-recording layer 22 can be made to be the reflectance-modulation type information-recording layer.

In the second information-recording layer 22, for the purpose of obtaining a sufficiently modulated signal and also increasing S/N, the width of recording area is regulated corresponding to the wavelength λ of light source in readout optical system and the numerical aperture NA of condenser lens.

Therefore, even if the second information-recording layer 22 is composed of the same material as the first information-recording layer 21, the width of a recording-area may be different from each other.

Furthermore, when the recording film forming the two information-recording layers 21, 22 are composed of the organic dye film, the following operation will be performed.

In this case, because a change in refractive index is caused before and after recording, a signal can be detected without providing the reflective film on the recording film.

Specifically, a refractive index of the organic dye film before recording is set to greatly differ from a refractive index of its adjacent layer such as the substrate so that reflection may occur at a boundary surface between the organic dye film and the substrate. At the same time, the refractive index of the organic dye film after recording is set to be near to that of the substrate so as to reduce reflectance at the boundary surface between the organic film and substrate. This makes it possible to detect the signal.

In this case, because the reflectance is directly detected, recording or reproduction of information is performed by the reflectance-modulation method.

On the other hand, when the reflective layer 12 is provided on the recording film, a change in reflectance before and after recording is reduced and an optical-path length inside the recording film changes due to the above-described change in refractive index. This causes the phase of reflected return light to change before and after recording. Thus, it will be possible to detect the signal, utilizing the interference of return light having different phase.

In this case, recording or reproduction of information is performed by the phase-modulation method.

Therefore, when recording films forming information-recording layers 21, 22 are composed of the organic dye films, recording or reproduction of information can be performed by either phase-modulation method or reflectance-modulation method depending on whether the reflective layer 12 exists or not.

Additionally, in the first information-recording layer 21 and second information-recording layer 22, the recording area may be provided on either surface of two surfaces between which there is a step formed by a guide groove, that is, on a surface near to the light-incident side (a land portion) and a surface distant from the light-incident side (a groove portion).

When the recording area is provided on either of the land portion or the groove portion, the width of the recording area is set corresponding to a spot size of the incident light L (dependent on the wavelength λ of light source and the numerical aperture NA of objective lens) such that a sufficient modulation factor can be obtained by the reflectance-modulation method or phase-modulation method to enable information on the information-recording layers 21 and 22 to be recorded or reproduced.

For example, where the wavelength λ of light source is 405 nm and the numerical aperture NA of objective lens is 0.85, it is desirable for the recording-area width to be 0.12 μm to 0.25 μm in order to employ the reflectance-modulation method, and it is desirable for the recording-area width to be 0.09 μm to 0.22 μm in order to employ the phase-modulation method.

If the wavelength λ of light source is made to be in the range of 360 nm to 460 nm, because the wavelengths are shorter than those in an conventional optical disc such as CD-R, a size of the light spot can be reduced and thus the recording density of optical recording medium can be improved.

Recording and reproduction can be performed on the first and second information-recording layers 21 and 22 by the same optical head.

By using an optical pickup having an optical head for recording on or reproducing from an optical disc including one information-recording layer composed of the organic dye film, and by moving the pickup, for example, for focusing (focalization) in the direction approximately perpendicular to a principal plane of the optical disc, a light spot by the incident light L is made to move between the first information-recording layer 21 and the second information-recording layer 22 to record or reproduce information on the respective information-recording layers 21 or 22.

Figure 3:
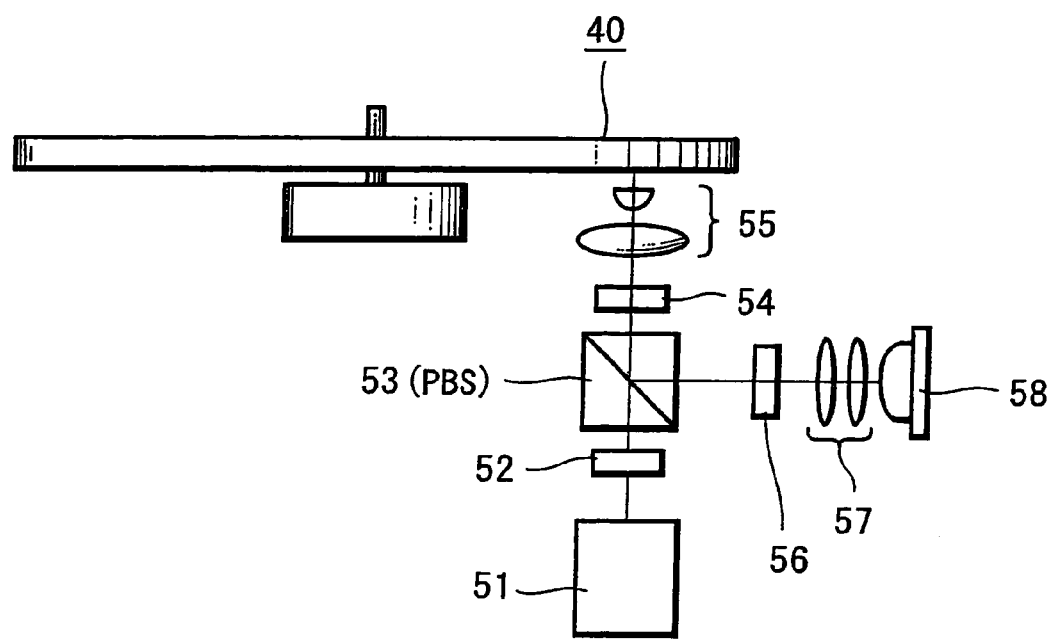
FIG. 3 is a schematic structural diagram of an example of an optical pickup for recording or reproducing information on the optical disc shown in FIG. 1.

In this context, a schematic structural diagram of an example of an optical pickup for recording or reproducing information on the optical disc 10 according to the above-described embodiment will be shown in FIG. 3.

This optical pickup includes a light source 51, a grating 52, a polarized beam splitter (PBS) 53, a λ/4 plate 54, an objective lens 55, a Wollaston polarizing prism 56, a group of lenses 57 consisting of a condenser lens and cylindrical lens, and a light detector 58. The light source 51 is composed as a unit which includes, though not shown in the figure, a semiconductor laser emitting laser light of a wavelength of, for example, 405 nm, a collimator, and an anamorphic prism. The objective lens 55 is composed of two optical lenses. The light detector 58 acts as a servo detector and a RF detector.

By using the optical pickup having such structure, whether the optical disc 40 is the optical disc 10 according to the above-described embodiment or an optical disc having only one information-recording layer composed of organic dye, it is possible to perform recording or reproduction of information.

According to the above-described present embodiment, by providing the reflective layer 12 which is adjacent to the first information-recording layer 21, it is possible to enhance reflectance by the reflective layer 12 to increase the intensity of a signal from the first information-recording layer 21, with the result that a change in reflectance before and after recording can be reduced.

Further, because the change rate $(R_0-R)/R_0$ of reflectance before and after recording at a position corresponding to the inside of information-recorded mark is made to be smaller than the modulation factor of a reproduction signal detected from the information-recorded mark, it is possible to employ the phase-modulation method for recording or reproducing information with respect to the first information-recording layer 21.

On the other hand, because no reflective layer is provided on the second information-recording layer 22, light transmissivity of the second information-recording layer 22 can be enhanced, whereby a sufficient amount of light can reach the first information-recording layer 21.

Moreover, because the change rate $(R_0-R)/R_0$ of reflectance before and after recording at a position corresponding to the inside of information-recorded mark is made to be greater than the modulation factor of a reproduction signal detected from the information-recorded mark, it is possible to employ the reflectance-modulation method for recording or reproducing information with respect to the second information-recording layer 22.

This makes it possible to materialize the optical disc 10 including two or more information-recording layers 21 and 22, while the organic dye is, for example, used for material of the information-recording layers.

When a multiple layer of the information-recording layers 21, 22 is thus formed, a recording density of the optical disc 10 becomes considerably high.

Furthermore, when the organic dye is thus employed for a material of the information-recording layers, or when the recording film forming the information-recording layer is made of the organic dye film, it is further possible to make the manufacturing simpler and the price lower.

In addition, a dielectric protective film may be formed between each of the information-recording layers 21, 22 and the intermediate layer 13, or between the second information-recording layer 22 and the surface-protective layer 14.

Next, an optical disc having the structure of the above-described embodiment was actually prepared for examining its characteristics.

PRACTICE EXAMPLE 1

An optical system was constructed using a blue LD as a light source, that is a semiconductor laser diode (an oscillating wavelength: 405 nm) emitting a blue color light, and using an objective lens that has a numerical aperture (NA) of 0.85.

The structure of each layer of the optical disc 10 was then optimized for this optical system.

Specifically, each layer of the optical disc 10 was composed as follows.

Substrate 11: polycarbonate resin
Reflective layer 12: Ag-alloy-sputtered film 30 nm
The first information-recording layer 21: organic dye film (triphenylamine tetramer) 40 nm
Intermediate layer 13: UV-curing resin 30 μm
The second information-recording layer 22: organic dye film (triphenylamine tetramer) 40 nm
Surface-protective layer 14: UV-curing resin 80 μm It is desirable for the film thickness of the intermediate layer 13 to be 15 μm or more in order to suppress cross talk between the first information-recording layer 21 and the second information-recording layer 22, so that the thickness thereof was made to be 30 μm.

For the first and second information-recording layers 21 and 22, there was employed triphenylamine tetramer, or particularly N,N'-Bis (4-diphenylamino-4-biphenyl)-N,N'-diphenylbenzidine (Cas No. 7218-46-4). This will hereinafter be abbreviated to triphenylamine.

The triphenylamine has a refractive index of 2.31 and an absorption coefficient of 0.13 at a wavelength 405 nm of light source. Further, its refractive index after recording is 2.1.

The triphenylamine can be formed into a film by vacuum evaporation.

Additionally, UV-curing resin having a brand name SD-301 was used for the intermediate layer 13 and surface-protective layer 14; however other materials, such as UV-curing adhesive or a combination of polycarbonate sheet with adhesive can also be used to form those layers.

Materials of the reflective layer 12 only need to be those having a sufficiently high reflectance at a wavelength of light source in the readout optical system, so that when the above-described blue LD is used for the light source, for example, Al-based materials can be employed.

In addition, as to the first and second information-recording layers 21 and 22, other organic dye materials can be employed which is optimized when the blue LD is a light source. Any other material capable of being formed by spin coating or sputtering can be employed to form the information-recording layer by the spin coating or sputtering.

Using the above-described respective materials the optical disc 10 having the structure shown in FIG. 1 was prepared as follows.

To start with, the substrate 11 was prepared by injection molding, which is made of a polycarbonate material and has a guide groove (for the first information-recording layer 21) formed thereon.

Next, the reflective layer 12 was formed on the substrate 11 by sputtering an Ag alloy into the film.

Subsequently, a triphenylamine film was formed on the reflective later 12 by vapor deposition into the first information-recording layer 21.

Next, the intermediate layer 13 composed of UV-curing resin was formed on the first information-recording layer 21.

Further, a stamper in the shape of a guide groove (for the second information-recording layer 22) was pressed to the intermediate layer 13 for transferring the guide groove by UV-curing.

Additionally, in the guide grooves for the first and second information-recording layers 21 and 21, a track pitch of each guide groove was made to be both 0.32 μm. A depth of each guide groove was made to be both 20 nm.

Moreover, in the first and second information-recording layers 21 and 22, of high and low planes of a level difference formed by the guide groove, the plane nearer to the light-incident side, that is, the land portion was made to be the recording area.

In the guide groove for the first information-recording layer 21 formed on the substrate 11, a width of the recording area, or land portion was made to be 0.12 μm so as to obtain a sufficient detected signal by the phase-modulation method.

In the guide groove for the second information-recording layer 22 formed on the intermediate layer 13, a width of the recording area, or land portion was made to be 0.16 μm which is wider than that of the guide groove for the first information-recording layer 21, so as to record or reproduce by the reflectance-modulation method with respect to the second information-recording layer 22.

Subsequently, a triphenylamine film was formed on the intermediate layer 13 by vacuum deposition into the second information-recording layer 22.

Then, the surface-protective layer 14 composed of UV-curing resin was formed on the second information-recording layer 22 to prepare the optical disc 10 having the structure shown in FIG. 1. This is correspondent to the optical disc 10 of Practice example 1.

(Estimation)

With respect to the optical disc 10 of Practice example 1, the amount of reflected light was measured first with a constant amount of incident light.

As a result, the amount of return light from the second information-recording layer 22 was 13% and the amount of return light from the first information-recording layer 21 was 14%.

The result is not contradictory to the fact that reflectance when the information-recording layer is composed of a single layer of the first information-recording layer 21 is 25% and light transmissivity in the second information-recording layer 22 is 74%.

Additionally, light transmissivity within the information-recorded mark after recording on the second information-recording layer 22 is 78%, whereas average light transmissivity in the whole recording area is 76%. Thus, the amount of return light from the first information-recording layer 21 after recording will increase; however, this is such an increment that makes no effect on characteristics of a signal obtained by the return light, so that no problem will be raised.

Subsequently, a recording and reproduction experiment was carried out with respect to this optical disc 10 of Practice example 1.

To begin with, the recording was carried out on the second information-recording layer 22. The recording conditions were as follows. A linear velocity in recording was 5.72 m/s and a recording pattern was a carrier-wave pattern whose mark length and space length were respectively 0.69 µm . Further, light intensity in recording was 5.0 mW and the mark of 0.69 µm long was recorded by applying seven pulses of duty factor 50%.

As a result, a rectangular wave signal of modulation factor 40% was obtained.

In this connection, since light transmissivity of the second information-recording layer 22 is 74% as described above, when recording is performed on the first information-recording layer 21, it is necessary to increase the amount of incident light by the amount corresponding to a loss in the second information-recording layer 22. However, apart from this amount of incident light, there occurs no problem that makes an effect on the recording characteristics.

Since the optical disc 10 is the write-once type, recording is performed first from the first information-recording layer 21. Accordingly, when recording is performed on the first information-recording layer 21, nothing is recorded on the second information-recording layer 22. Thus, its light transmissivity is definite and there is almost no change in necessary recording power.

Subsequently, recording was performed on the first information-recording layer 21 of the optical disc 10 in Practice example 1 and then reproduction was performed from the first information-recording layer 21 in a state where nothing was recorded on the second information-recording layer 22.

As a result, almost the same signal as in the case where recording and reproduction was performed only toward the second information-recording layer 22 was obtained. A modulation factor was 50% then.

This showed that the same signal could be obtained from the first information-recording layer 21 and the second information-recording layer 22.

Furthermore, recording was performed in order of the first information-recording layer 21 and the second information-recording layer 22 of the optical disc 10 in Practice example 1; and after recording had been performed on the whole recording area, readout of the first information-recording layer 21 was performed.

As a result, although light transmissivity of the second information-recording layer 22 became larger than that in the previous case, because the amount of return light from the first information-recording layer 21 was about 15% and an interval between the first information-recording layer 21 and the second information-recording layer 22 were sufficiently large, almost no interference of code between the layers was observed and almost the same signal waveform as in the above case where recording was performed only on the first information-recording layer 21 was obtained.

This proves that recording and reproduction are properly performed with respect to the two information-recording layers 21 and 22 of the optical disc 10 in Practice example 1.

Therefore, it is shown that the two information-recording layers 21 and 22 can make the recording density higher than that of an optical disc having a single information-recording layer.

COMPARISON EXAMPLE

On the other hand, an optical disc was prepared as a comparison example, to which the present invention was not applied, and in which no reflective layer 12 made of a metal film was provided between the first information-recording layer 21 and the substrate 11, and also the first information-recording layer 21 was made to have the same film structure and guide-groove shape (the width of the recording area: 0.16 µm ) as those of the second information-recording layer 22, the other structures being the same as those of the optical disc 10 in Practice example 1.

In this comparison example, the amount of the light detected from the first information-recording layer 21 fell down to 10%, S/N becoming lower, and also focus servo going unstable to be in an impractical level.

In addition, when another comparison example is prepared, in which the reflective layer is also provided on the second information-recording layer 22 and which employs the same detection principle as in the first information-recording layer 21, it is needless to say that no signal can be obtained from the first information-recording layer 21.

PRACTICE EXAMPLE 2

Next, an example in which the amount of reflected light from the first information-recording layer 21 is further raised by making a film thickness of the reflective film thicker will be shown. By doing so, even when more multiple layers are laminated, it will be easy to detect a signal from the first information-recording layer 21.

Figure 2:
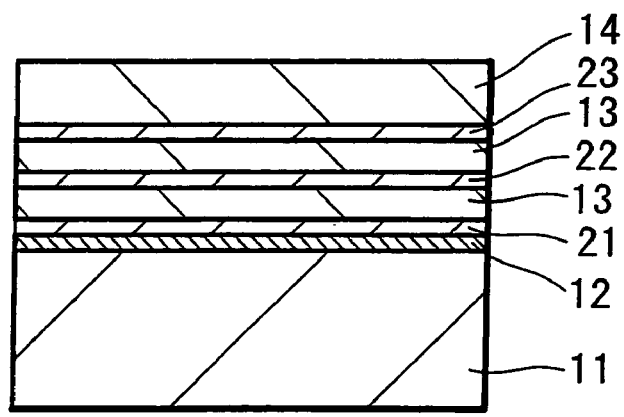
FIG. 2 is a sectional diagram of an optical disc having three information-recording layers.

In this example, as shown in FIG. 2, a third information-recording layer 23 is further provided on the side of the incident plane in addition to the second information-recording layer 22. In other words, the optical disc 20 in this example includes three information-recording layers 21, 22 and 23 in total.

Additionally, in this Practice example 2, the film thickness of an Ag metal film serving as the reflective layer 12 was made to be 50 nm. Moreover, for the second information-recording layer 22 and the third information-recording layer 23 there was employed an organic dye film having the same structure (a material, a film thickness, a width of recording area) as in the second information-recording layer 22 of the optical disc 10 in Practice example 1. In this case, two layers of the intermediate layer 13 are formed.

At this time, reflectance in the first information-recording layer 21 was 35%.

Regarding the optical disc 20 in this Practice example 2, the amount of return light from the first information-recording layer 21 was observed.

As a result, the amount of return light before recording was 10% of the amount of incident light and a signal of modulation factor 30% was detected.

This shows that, by using the structure of this Practice example 2, even the optical disc having three information-recording layers can also attain a practical level.

In contrast, in the optical disc 20 shown in FIG. 2, when no reflective layer 12 made of the Ag metal film was formed or when a film thickness of the reflective layer 12 reached only about 30 nm, the amount of return light from the first information-recording layer 21 was too small to detect, thereby making focus servo disabled from working.

In this context, the reason why the widths of recording areas of the first information-recording layer 21 and the second information-recording layer 22 were made to be 0.12 μm and 0.16 μm respectively in the above-described practice examples will be explained on the basis of experimental results. This experiment was performed in the same manner while the width of recording area was changed, results of which are shown below.

Figure 4A:
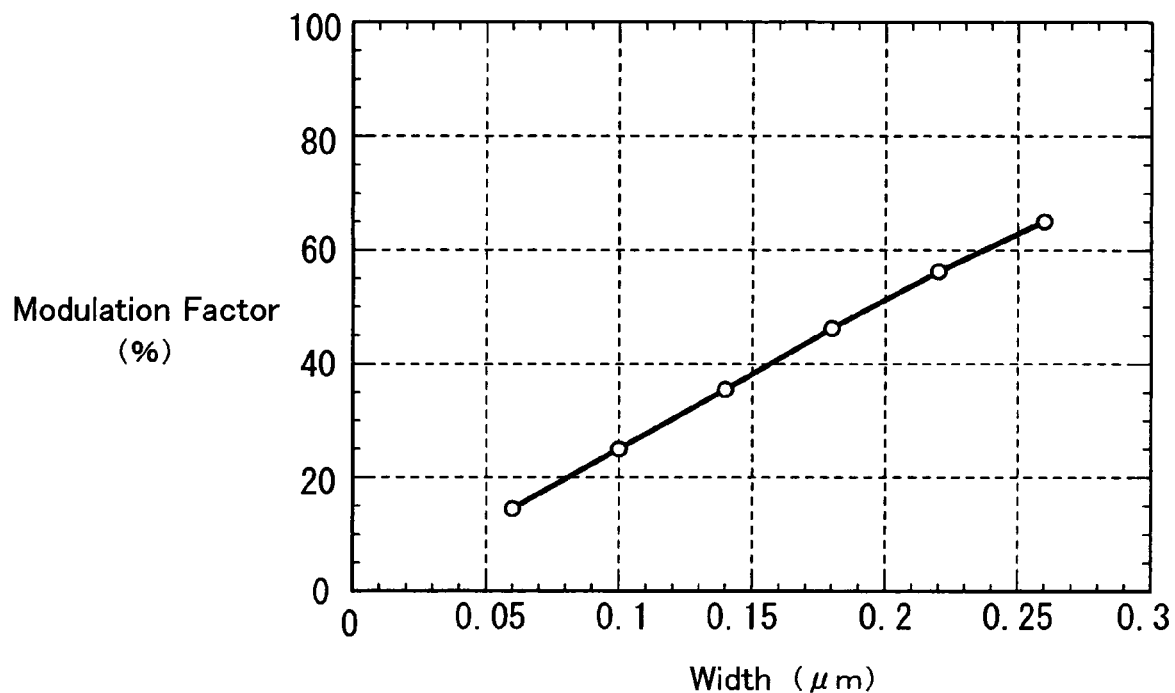
FIGS. 4A and 4B are graphs showing results of measuring modulation factors while changing a guide-groove width of the information-recording layer.

First of all, while the width of recording area in the second information-recording layer 22 was varied in the range of 0.06 μm to 0.26 μm, modulation factors of detected reproduction signals were measured, results of which are shown in FIG. 4A.

When the width of recording area was made to be 0.16 μm, a modulation factor was 40% as described above. It is seen, however, from FIG. 4A that when the width of recording area was made to be still narrower, modulation factors will be lower.

This is because, as the width of the information-recorded mark becomes narrower in the reflectance-modulation system, the amplitude of detected signal goes smaller accordingly. It is considered that the modulation factor falls corresponding to the narrowed width of recording area.

In this reflectance-modulation system, as the width of information-recorded mark becomes wider, the modulation factor rises. However, as the width approaches the track pitch, the cross talk increases to make it unfit for high recording density. In the above-described Practice examples, since the track pitch was made to be 0.32 μm, when the width of information-recorded mark was made to be 0.25 μm, the cross talk rose up to −20 dB (a ratio between a carrier level in a recording track and a carrier level in the adjacent track). Thus, the information-recorded mark having the width wider than that was impracticable. It was found preferable for the modulation factor to be 30% or more from experience, striking a balance between the modulation factor and the signal-to-noise ratio. If it is less than 30%, S/N will be insufficient and impractical.

It is understood from these facts that the width of recording area is desired to be in the range of 0.12 to 0.25 μm in case of the reflectance-modulation system. Having the width of 0.16 μm employed in the above-described Practice examples allows satisfactory characteristics to be obtained.

The width P of the recording area varies in its optimum value depending on the diameter of a light spot. The diameter of a light spot is a function of a wavelength λ of the incident light and a numerical aperture NA of the objective lens. If λ/NA=α, because λ=0.4059 μm, NA=0.85 in this Practice example, it is found that a relation $$0.25\alpha < P < 0.525\alpha$$

is preferable. Additionally, a unit used in this formula is all μm.

In addition, a light spot of the incident light L has a light distribution called airy disk having a surrounding wide foot, so that the information-recorded mark is usually smaller than the light spot. For this reason, when a signal is detected using the reflectance-modulation system, a ratio of the reflectance inside the information-recorded mark to the reflectance before recording becomes larger than the modulation factor of the detected signal.

Figure 4B:
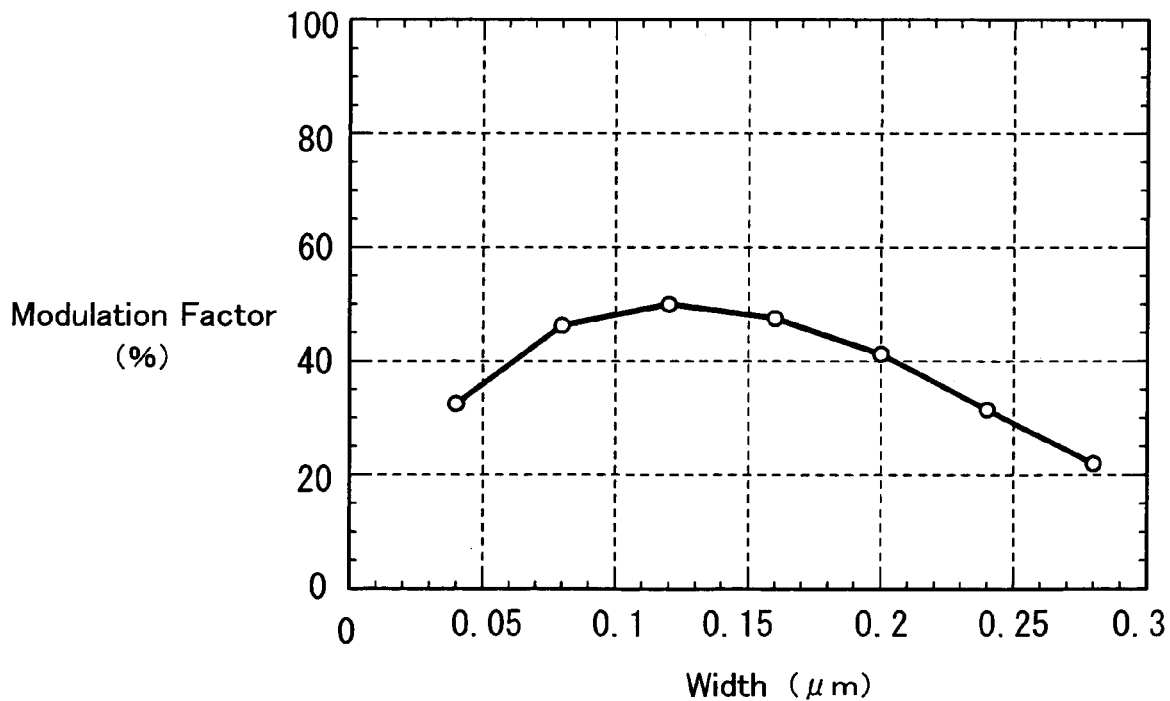

Next, the width of recording area in the first information-recording layer 21 was changed in the range of 0.04 μm to 0.28 μm and then modulation factors of the detected reproduction signals were measured, results of which are shown in FIG. 4B.

As described above, when the width of recording area was 0.12 μm, the modulation factor was 50%. It can be understood from FIG. 4B that if the width becomes narrower than that, the modulation factor falls.

The guide groove was formed by exposing a photoresist to electron beam in a master-making process. On this occasion, if the width was too small, the disarray of its wall surface became noticeable to bring about a rise of noise level.

Therefore, because the noise level rose and S/N fell even if there was a modulation factor to some extent, the width of recording area of 0.09 μm or less was impracticable. Moreover, if the width was 0.22 μm, then the modulation factor lowered down to about 30% and S/N also fell impracticably.

It is understood from these facts that, when recording or reproduction is performed using the phase-modulation system, the width of recording area is desired to be in the range 0.09 μm or more to 0.22 μm or less. Particularly, when the width of recording area is 0.12 μm as employed in the above-described Practice examples, satisfactory characteristics are obtained.

In addition, if a function λ/NA=α is employed where λ is a wavelength of light and NA is a numerical aperture of objective lens, it is found that the optimum value of the width P of recording area in case of the phase-modulation system should preferably have the following relation with α

$$0.19\alpha < P < 0.46\alpha.$$

Additionally, a single unit μm is employed in this formula.

From FIGS. 4A and 4B it is understood that regarding dependence on the width of recording area quite different characteristics are observed with respect to the first information-recording layer 21 and the second information-recording layer 22. This is considered due to the fact that the first information-recording layer 21 and the second information-recording layer 22 each have greatly different reflectance inside the information-recorded mark after recording.

In the above-described embodiment and Practice examples, the present invention is applied to the optical recording medium 10 which has two or three information-recording layers 21, 22, 23 and makes light incident on the side opposite to the substrate 11. The present invention, however, can be applied to other structures.

For example, the structure which makes light incident on the substrate side of optical recording medium may be employed. In this case, the substrate is made to be a transparent substrate and also a reflective layer is provided on the side opposite to the substrate of an information-recording layer which is most distant from the substrate.

If constructing in this way, it is possible to secure the compatibility with an optical recording medium which makes light incident on the substrate side and has a single information-recording layer, and to perform recording or reproduction with respect to either optical recording medium, using the same optical head.

Moreover, the material of information-recording layer is not limited to the organic dye and other materials can be employed. The type of optical disc is also not limited to the write-once type and may include the rewritable type or the read-only type.

Furthermore, if it is possible to provide a plurality of information-recording layers and make light incident on the plurality of information-recording layers, the shape of optical recording medium is not limited to the disc form.

In the present invention, in any structure, in which the optical recording medium is constructed, it is constructed such that the first information-recording layer most distant from one principal plane forming the light-incident plane may be the phase-modulation type information-recording layer, and the other information-recording layer may be the reflectance-modulation type information-recording layer.

The present invention is not limited to the above-described embodiments and can have any other various structures without departing from the spirit thereof.

According to the above-described present invention, a signal can be detected from the first information-recording layer by the phase-modulation method and the signal can be detected from the other information-recording layer by the reflectance-modulation method, with a sufficient modulation factor in both cases.

This enables satisfactory recording and reproduction characteristics in a plurality of information-recording layers to be obtained.

Therefore, it is possible to materialize a high-density optical recording medium having two or more information-recording layers.

Particularly, when the reflective layer is provided on the side of the other principal plane with respect to the first information-recording layer, because reflectance can be enhanced by the reflective layer, a signal from the first information-recording layer can be sufficiently detected.

Moreover, when the recording film serving as the information-recording layer is particularly formed of the organic dye film, it is further possible to make the manufacturing simplified and the price lower.

The invention claimed is:

1. An optical recording and reproducing method for performing at least recording or reproduction of information with respect to an optical recording medium, characterized in that the optical recording medium has a plurality of information-recording layers between one principal plane on a side where light enters said optical recording medium and the other principal plane opposite thereto, a first information-recording layer that is nearest to said other principal plane is formed of a phase-modulation type information-recording layer and a second information-recording layer is formed of a reflectance-modulation type information-recording layer, and upon incidence of light from the side of said one principal plane, recording or reproduction of information is performed by the phase-modulation method with respect to said first information-recording layer, and recording or reproduction of information is performed by the reflectance-modulation method with respect to said second information-recording layer wherein a change rate $(R_0-R)/R_0$ in said first information-recording layer of said optical recording medium, where $R_0$ is reflectance before recording at a position corresponding to the inside of an information-recorded mark and R is reflectance after recording at the same position, is made to be smaller than the modulation factor of a reproduction signal detected from said information-recorded mark, and the same change rate $(R_0-R)/R_0$ with respect to said information-recorded mark in said second information-recording layer is made to be equal to or larger than the modulation factor of a reproduction signal detected from said information-recorded mark.

2. An optical recording medium comprising:

a plurality of information-recording layers between one principal plane on which light can be incident and an other principal plane on a side opposite to said one principal plane, a first information-recording layer that is nearest to said other principal plane is a phase-modulation type information-recording layer, and a second information-recording layer is a reflectance-modulation type information-recording layer, wherein a change rate $(R_0-R)/R_0$ in said first information-recording layer, where $R_0$ is reflectance before recording at a position corresponding to the inside of an information-recorded mark and R is reflectance after recording at the same position, is made to be smaller than the modulation fhctor of a reproduction signal detected from said information-recorded mark, and the same change rate $(R_0-R)/R_0$ with respect to an information-recorded mark in said other information-recording layer is made to be equal to or larger than the modulation factor of a reproduction signal detected from said information-recorded mark.

3. An optical recording medium according to claim 2, wherein the width of recording area in said reflectance-modulation type information-recording layer is wider than the width of recording area in said phase-modulation type information-recording layer.

4. An optical recording medium according to claim 2, wherein, of said plurality of information-recording layers, at least one or more information-recording layers are formed of a recording film in which a change in the optical constant is caused by absorbing light.

5. An optical recording medium according to claim 4, wherein said recording film contains an organic material that causes a change in the physical property and thus the change in the optical constant by absorbing light.

6. An optical recording medium according to claim 5, wherein organic dye is employed as said organic material.

7. An optical recording medium according to claim 2, wherein a reflective layer is provided at a side of said other principal plane.

* * * * *